G. W. HALE.
CLUTCH.
APPLICATION FILED APR. 8, 1912.
1,265,906.
Patented May 14, 1918.
2 SHEETS—SHEET 1.
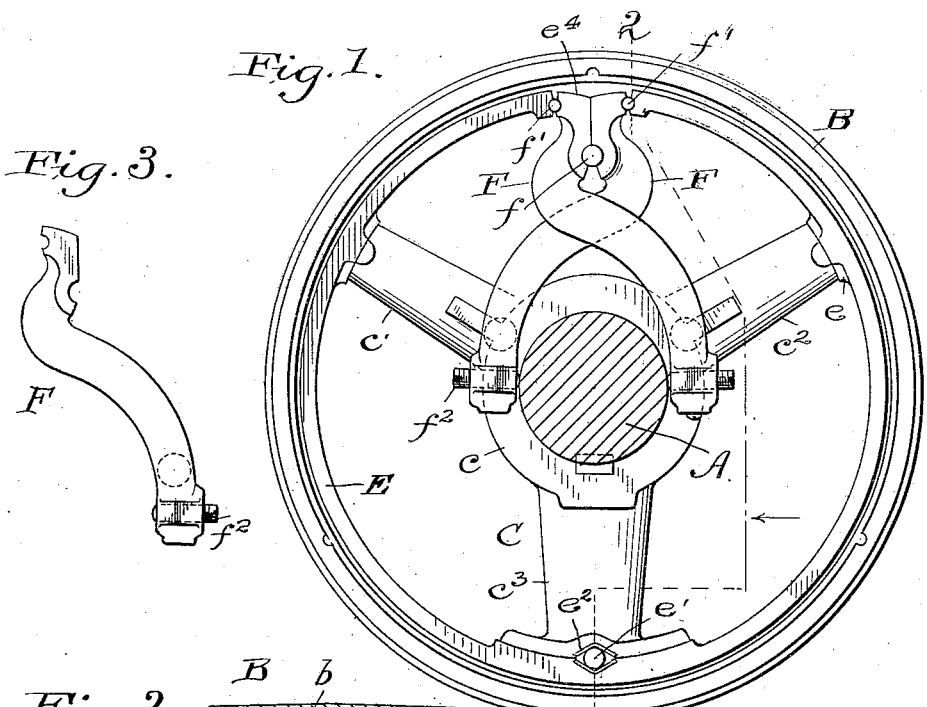
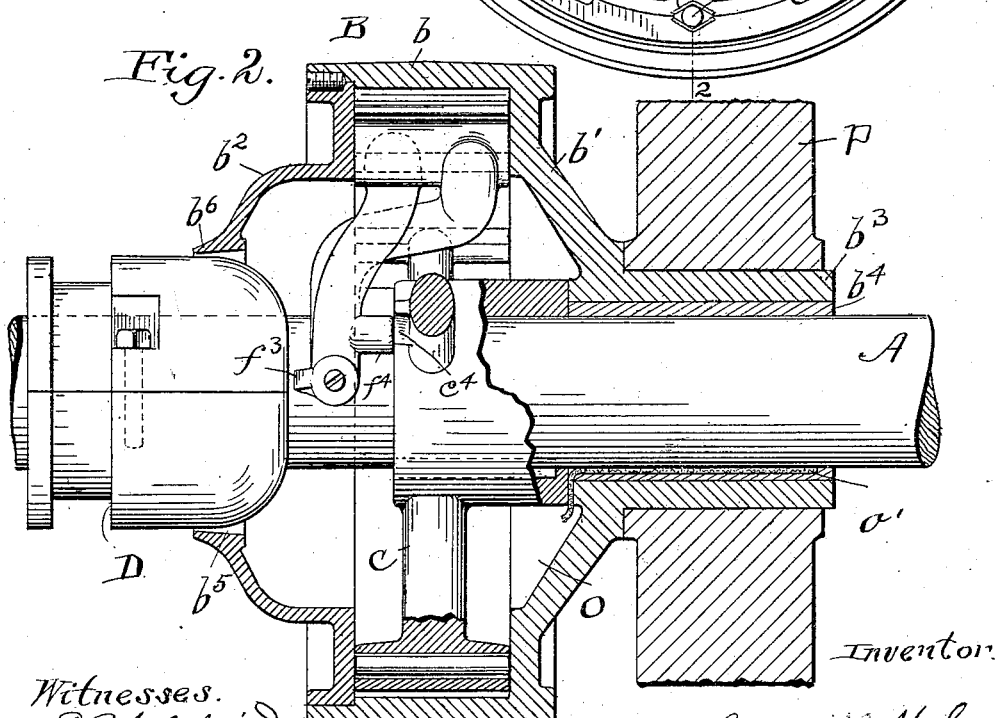
Witnesses.
E. B. Gilchrist
H. B. Sullivan
Inventor.
George W. Hale
by Thurston & Kwis
Attys.

G. W. HALE.
CLUTCH.
APPLICATION FILED APR. 8, 1912.
1,265,906.
Patented May 14, 1918.
2 SHEETS—SHEET 2.
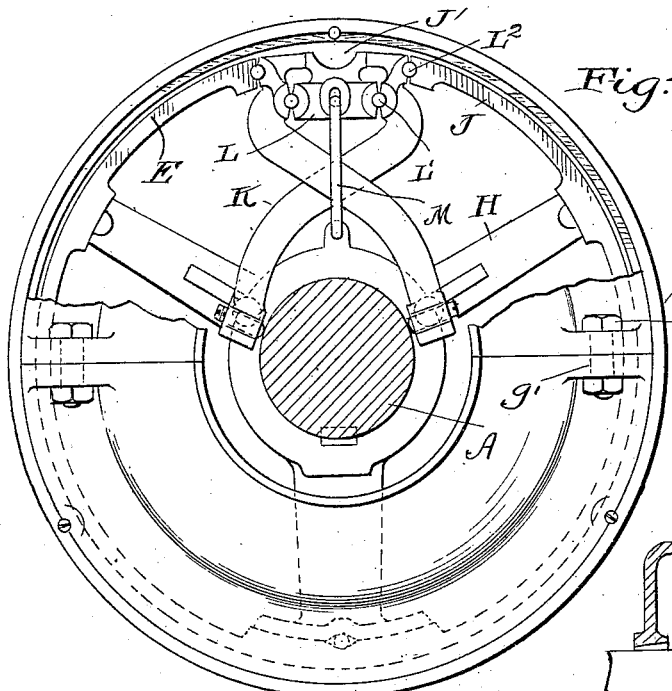
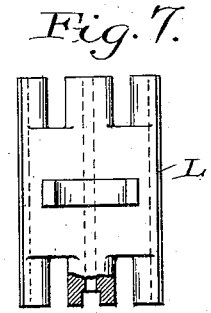
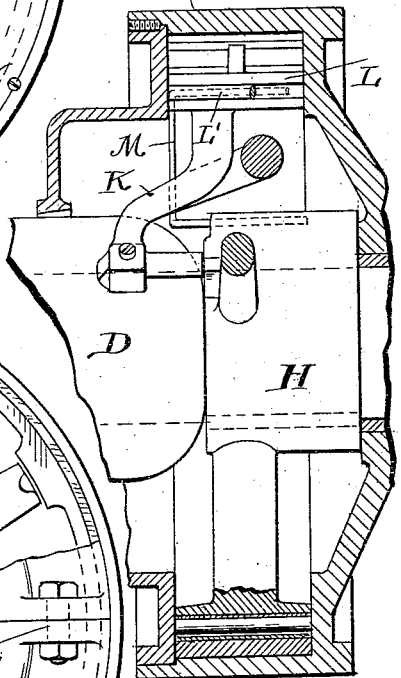
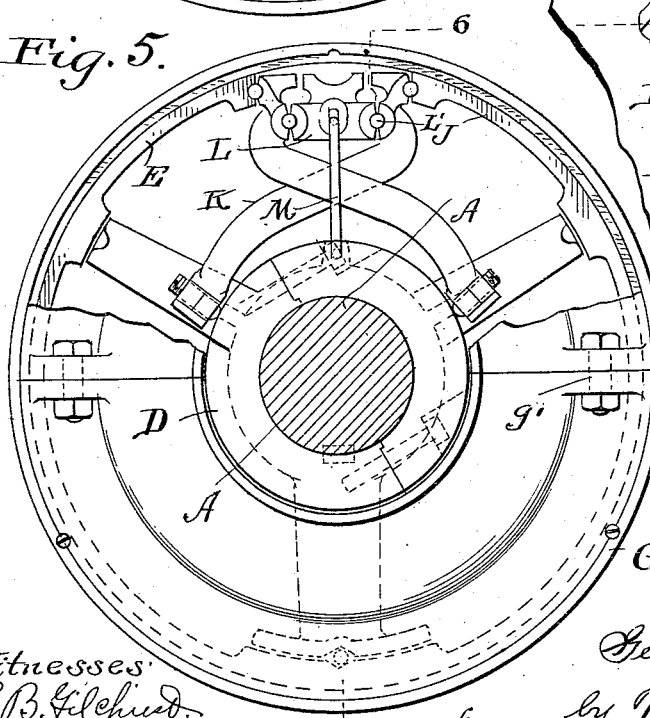
Inventor
George W. Hale
by Thurston & Kwis
Attys.
Witnesses
E. B. Gilchrist
H. B. Sullivan

UNITED STATES PATENT OFFICE.

GEORGE W. HALE, OF CLEVELAND, OHIO, ASSIGNOR, BY MESNE ASSIGNMENTS, TO THE RELIANCE GAUGE COLUMN COMPANY, OF CLEVELAND, OHIO, A CORPORATION OF OHIO.

CLUTCH.

1,265,906. Specification of Letters Patent. Patented May 14, 1918.

Application filed April 8, 1912. Serial No. 689,243.

*To all whom it may concern:*

Be it known that I, GEORGE W. HALE, a citizen of the United States, residing at Cleveland, in the county of Cuyahoga and State of Ohio, have invented a certain new and useful Improvement in Clutches, of which the following is a full, clear, and exact description.

This invention relates to improvements in clutches or to a self oiling loose pulley and clutch, and is an improvement over the construction disclosed in the patent to S. L. McAdams, No. 1,011,355, December 12, 1911, for combined loose pulley and clutch.

The object of the present invention is to provide a construction having certain improvements which increase the efficiency, durability and structural characteristics of a clutch or of a combined loose pulley and clutch of the general type disclosed in the aforementioned patent.

The above objects are attained by my invention, which may be here briefly summarized as consisting in certain details of construction and combinations and arrangements of parts which will be described in the specification and set forth in the appended claims.

In the drawings, Figure 1 is a side sectional elevation of a clutch constructed in accordance with one form of my invention, parts being removed to show the interior construction; Fig. 2 is a transverse sectional view substantially along the irregular line 2—2 of Fig. 1, looking in the direction indicated by the arrow; Fig. 3 is a detached view of one of the clutch fingers which is utilized in clutching the two main parts of the clutch in driving relation; Fig. 4 is a side view with parts broken away, illustrating a modification; Fig. 5 is a similar view of a portion of the clutch shown in Fig. 4 with the clutch fingers spread and the two main parts clutched together; Fig. 6 is a partial sectional view substantially along the line 6—6 of Fig. 5, and Fig. 7 is a detached view of the finger spacing block illustrated in the construction of Fig. 4.

My invention may be employed simply as a clutch, in which event, it may serve to clutch together two shaft sections or it may serve equally well as a combined loose pulley and clutch, in which case the male and female members of the clutch will be carried by a single shaft section. The latter use or adaptation of my invention is illustrated in the drawings.

The construction as illustrated includes a shaft A, a female clutch member B, and a male clutch member C. The part B is designed to be clutched to the part C, as will be hereafter described, or it may rotate freely on the part C, such as when it serves as a loose pulley. This part B is in the form of a rotary shell or oil inclosure and includes an outer rim $b$, and inwardly extending side walls $b'$ and $b^2$, the former being integral with the rim B, and the latter being in the form of a removable cover plate which is fastened in position by screws or the like. These parts form an oil inclosure space O which is adapted to be supplied with a quantity of lubricant designed to lubricate for a long period all the bearing parts. The side walls $b'$ extend inwardly toward the shaft A and are in this case provided with an integral outwardly extending bearing sleeve $b^3$ which is designed to receive a bearing bushing $b^4$ which bears upon shaft A. The bushing can, of course, be eliminated without material disadvantage. This integral bearing sleeve $b^3$ in this construction constitutes the sole bearing support for the rotating part B when serving as a loose pulley. The rim $b$ is adapted to receive a belt, but in case the clutch is designed to transmit exceptionally heavy loads, I may utilize the bearing sleeve $b^3$ as a supporting extension to which a large wheel or pulley P may be attached, and having a rim or pulley face which may accommodate a belt of sufficient width for the transmission of the desired load. The side wall $b^2$ opposite the wall $b'$ is provided about the shaft A and concentrically therewith with an opening $b^5$ of just sufficient size to receive a clutch cone D. The wall $b^2$ at said opening $b^5$ is provided with a tapered or inclined flange $b^6$ which tapers from its outer edge inwardly toward the interior and outwardly from the shaft. The narrowest part of the opening $b^5$ is slightly larger than the diameter of the clutch sleeve D so that any oil which tends to move outwardly over the sleeve will attach itself to the flange and be drawn inwardly into the oil inclosure by the action of centrifugal force.

By referring particularly to Fig. 1, it will be seen that the inner or male clutch member C consists of a spider having a hub $c$ which is keyed or otherwise fixed to the shaft A, and a number of outwardly projecting arms,—three arms $c'$, $c^2$ and $c^3$ being preferably provided. The inner clutch member carries clutching means which in this instance includes an expansible split metal band E which is normally supported on the outer ends of the spider arms, the latter at their outer ends being turned concentrically with respect to the axis of the shaft so that bearing lugs $e$ at the inner periphery of the band E may bear and have a good support on said arms. This band E is held to the arms of the spider and functions in a somewhat different manner than in the McAdams patent before mentioned. In this case, the band is not fastened to the spider arms $c'$, $c^2$, but is fastened to the spider only at one point,—namely to the center of the spider arm $c^3$. The fastening means consists of a hard metal pin $e'$ located in an opening formed partially in the inner part of the band E and in the outer end of the spider arm $c^3$. Hard metal batter plates $e^2$ may line said opening which receives the pin $e'$ so as to minimize liability of the opening being enlarged by wear. The pin $e'$ which fastens the band to the spider is preferably midway between the ends of the band and is substantially diametrically opposite an opening $e^3$ in said band.

To clutch together the parts B and C, the band E is spread or expanded against the inner periphery of the rim $b$ of the female clutch member B, and for spreading the band, I utilize a pair of clutch fingers F which have a scissors action or effect in spreading or contracting the band. These fingers are pivoted or fulcrumed upon a pin $f$ which is received in an opening formed partly in each of the adjacent faces of the fingers. The outer ends of the fingers are normally in engagement as illustrated in Fig. 1, and extend up into the opening $e^3$ in the band and are pivotally or loosely connected with the free ends of the band by pins $f'$, each being located in an opening formed partially in one end of the band and partially in the outer face of the end portion of one of the fingers. The two fingers at a point beneath the fulcruming pin $f$ are crossed as illustrated and extend inwardly to and partially about the shaft A, said fingers being provided at their inner free ends with adjustable screws $f^2$ which pass through the fingers and are designed to normally bear on the shaft A just above the axis of the shaft, as illustrated. The screws may be provided with common lock nuts for the obvious purpose of fastening the screws against accidental movement.

The band E when in its normal position is supported on the ends of all the spider arms and is then smaller in diameter than the inner periphery of the rim so as to be out of engagement with the latter. Furthermore, when the band occupies the position shown in Fig. 1, that is, when the parts of the clutch are unconnected or not in driving relation, the band E is under some tension and tends to contract and therefore forces together the outer ends of the clutch fingers F so as to constantly maintain said parts in substantially the position shown in Fig. 1.

To clutch together the two parts B and C, the clutch cone D is moved inwardly through the opening $b^5$ so as to engage and spread the inner ends of the clutch fingers F. The inner end of the cone sleeve is tapered as shown and the clutch fingers F have tapered lips $f^3$ which project toward the cone so that said fingers may be readily spread by the cone when the latter is moved inwardly. This movement of the cone and clutch fingers spreads the band so that all parts thereof between each free end of the band and the pin $e'$ bear firmly against the inner periphery of the rim $b$. In fact the clutching action is so great that enormous loads may be transmitted without any slippage. It will be noted that the fingers in spreading the band multiply by the leverage action the power which is applied to the spreading cone. The two halves of the band from the free ends thereof to the pin $e'$ are caused to bear at all points with substantially equal pressure against the inner surface of the rim $b$ by reason of the fact that the band is not fastened to the spider arm $c'$ or $c^2$, or at any point between the free ends of the band and the pin $e'$. Such action is secured by the movement outward of the blocks $e^4$ which are not fastened, and which are, of course, forced radially outward by the action of the fingers F, the inner ends of the latter riding up on the cone. The band, the blocks $e^4$ and the fingers are all free to move in this manner and in this way it is possible to force the ends of the bands in both a circumferential or tangential direction and also radially outward.

The band when disengaged, is spaced at all points from the pulley B. In order to engage it therewith, it must be forced outwardly. This can be done by spreading the ends of the band, but in order to insure contact between the parts of the band lying near the ends and the pulley, it is necessary to move these ends radially outward as well as apart. To move them radially involves having a movable axis for the pivoted spreading fingers, which is here secured by providing what may be termed floating fingers pivoted together but not about an axis that is fixed. In this way complete contact between band and pulley is secured, which can never be obtained when spreading the band ends by means of fixed fingers, that is, fingers having a fixed axis, so long as the axis lies between the pulley and the center of the band because the end of the arms or fingers then move away from the pulley when swung, and draw the band ends away instead of toward it.

To steady the fingers and to hold the latter firmly in place during the movements of the clutch sleeve, the fingers are preferably provided at their inner ends with axially or inwardly projecting bosses $f^4$ which bear against the outer faces of lugs $c^4$ integral with the spider arms $a'$ $c^2$.

It will be noted that the spider arm $c^3$ is larger and heavier than either of the spider arms $c'$ or $c^2$. This arm is made heavier than the other arms, not only because it has fastened to it the clutch band E, but also to provide a balanced construction, the additional weight in the spider arm $c^3$ substantially balancing the weight of the clutch fingers which are located substantially diametrically opposite the arm $c^3$.

As before stated, the oil inclosure is provided with a quantity of lubricant to lubricate for a long period the bearing parts. This lubricant which is thrown outwardly toward the inner periphery of the rim by centrifugal force causes the outer and inner parts to have free relative movement when one part is rotating relative to the other, and also enables me to employ metal on metal in the adjacent clutching parts without any material wear or injury to the said parts. Furthermore, the oil which is provided within the inclosure O serves to effectively lubricate the bearing surfaces of the shaft and of the bearing sleeve $b^3$, or in this case, of the bushing $b^4$. In order that these bearing surfaces may be constantly lubricated from this source of oil supply, I employ an oil-carrying wick $o'$ which is located in a groove of the bushing $b^4$ or sleeve, as illustrated in Fig. 2, and has its inner end projecting loosely into the space of the oil inclosure. I have found in practice that the sleeve $b^3$ if properly proportioned to support the rotating parts, is of sufficient length to prevent the loss or waste of oil at the outer end of the sleeve $b^3$.

My invention, including all the essential features of the construction illustrated in Figs. 1 and 2 may be embodied equally well in a clutch of the form known as the split clutch. A clutch of this type is illustrated in Figs. 4 and 5. In this clutch, the female part, here designated G, is in two halves which are clamped together by bolts $g$ which pass through lugs $g'$ at the adjacent faces of the two halves, the pulley or part G being, of course, split or divided on a diametrical line as indicated. The spider or male clutch member, here designated H, will also be divided on a diametrical line, and the parts can be held together by bolts, not here shown. The two parts G and H of the clutch are otherwise the same form or construction as illustrated in Figs. 1 and 2, and need not be described in detail, it being understood that these parts are split so that they can be placed or mounted upon a shaft without the necessity of dismounting the shaft. In the split clutch, it is unnecessary to divide or form in two parts the clutch band here designated J. In order that the band may be formed in one piece, and still slip over the shaft, the opening $J'$ corresponding to the opening $e^3$ of Fig. 1 is made large enough so that the shaft can be passed through the opening. With an opening $J'$ equal or substantially equal in length to the diameter of the shaft, I prefer to employ a somewhat different clutch finger construction and arrangement than illustrated in Figs. 1 and 2. To expand or spread the band, I employ with this construction, two fingers K which are crossed as in the prior construction, and have their inner ends adjacent and extending partially about the shaft and their outer ends between the ends of the band. The fingers are in this instance, not pivoted directly together, but between the outer portions of the fingers, I employ a finger-spacing block L to which the two fingers are pivoted by pins $L'$. The outer ends of the fingers are connected to the ends of the band by pins $L^2$. To assist in holding the block and the fingers in proper position relative to one another and to the other parts, I may connect the block to the hub of the spider by a bail or strap M. I do not regard this element, however, as absolutely necessary in the construction.

Having thus described my invention, what I claim is:

1. In a clutch, the combination of a driving and a driven member, one being hollow and concentrically inclosing the other, an expansible split ring non-rotatably but radially movable with respect to the inner member, two crossed interpivoted fingers having their outer ends in pivotal engagement with the ends of said ring, the point of pivotal connections between said fingers lying radially within the points of pivotal engagement of the outer ends of said fingers with said ring, said fingers being adapted to have a combined outward movement from said inner member, and means for spreading the inner ends of said fingers and at the same time moving the two fingers together in a radial direction.

2. In a clutch, the combination of a driving and a driven member, one being hollow and concentrically inclosing the other, an expansible split ring non-rotatably but radially movable with respect to the inner member, two crossed interpivotal fingers having their outer ends in pivotal engagement with the ends of said ring, the point of pivotal connection between said fingers lying radially within the points of pivotal engagement of the outer ends of said fingers with said ring, said fingers being adapted to have a combined outward movement from said inner member, and a cone shaped sleeve adapted to engage and spread the inner ends of said fingers and at the same time move the two fingers together in a radial direction.

In testimony whereof, I hereunto affix my signature in the presence of two witnesses.

GEORGE W. HALE.

Witnesses:
H. R. SULLIVAN,
A. F. KWIS.

Copies of this patent may be obtained for five cents each, by addressing the "Commissioner of Patents, Washington, D. C."